United States Patent [19]

Logue

[11] 4,337,633

[45] Jul. 6, 1982

[54] CYLINDER HANDLING DEVICE

[75] Inventor: Harold W. Logue, North Olmsted, Ohio

[73] Assignee: General Electric Company, Schenectady, N.Y.

[21] Appl. No.: 165,609

[22] Filed: Jul. 3, 1980

[51] Int. Cl.³ .............................................. B21D 3/00
[52] U.S. Cl. ........................................ 72/94; 72/422
[58] Field of Search .................. 72/88, 89, 90, 91, 92, 72/93, 94, 422; 198/379, 380, 415; 113/27, 113 A, 115, 120 M

[56] References Cited

U.S. PATENT DOCUMENTS

| | | | |
|---|---|---|---|
| 2,745,462 | 5/1956 | Drygulski | 72/92 |
| 3,722,657 | 3/1973 | Kienle | 198/415 |
| 3,734,268 | 5/1973 | Burger et al. | 198/380 |
| 3,869,042 | 3/1975 | Floyd et al. | 198/380 |
| 3,901,381 | 8/1975 | Quinn | 198/379 |

*Primary Examiner*—Lowell A. Larson
*Attorney, Agent, or Firm*—John F. McDevitt; Philip L. Schlamp; Fred Jacob

[57] ABSTRACT

A method and apparatus is disclosed for removing any out-of-round condition found in deformable metal cylinders by means of gripping the vertically aligned cylinder successively between a pair of spaced apart endless conveyor belts. The metal cylinders are fed to said pair of endless conveyor belts by moving alignment means which orients each cylinder with the cylindrical axis in a vertical direction and aligns said vertically oriented cylinders in a row while being fed to the cooperating belt members. In a preferred embodiment, the cylinder alignment is accomplished with a vertical gas column while the cylinders are proceeding in a horizontal direction.

8 Claims, 2 Drawing Figures

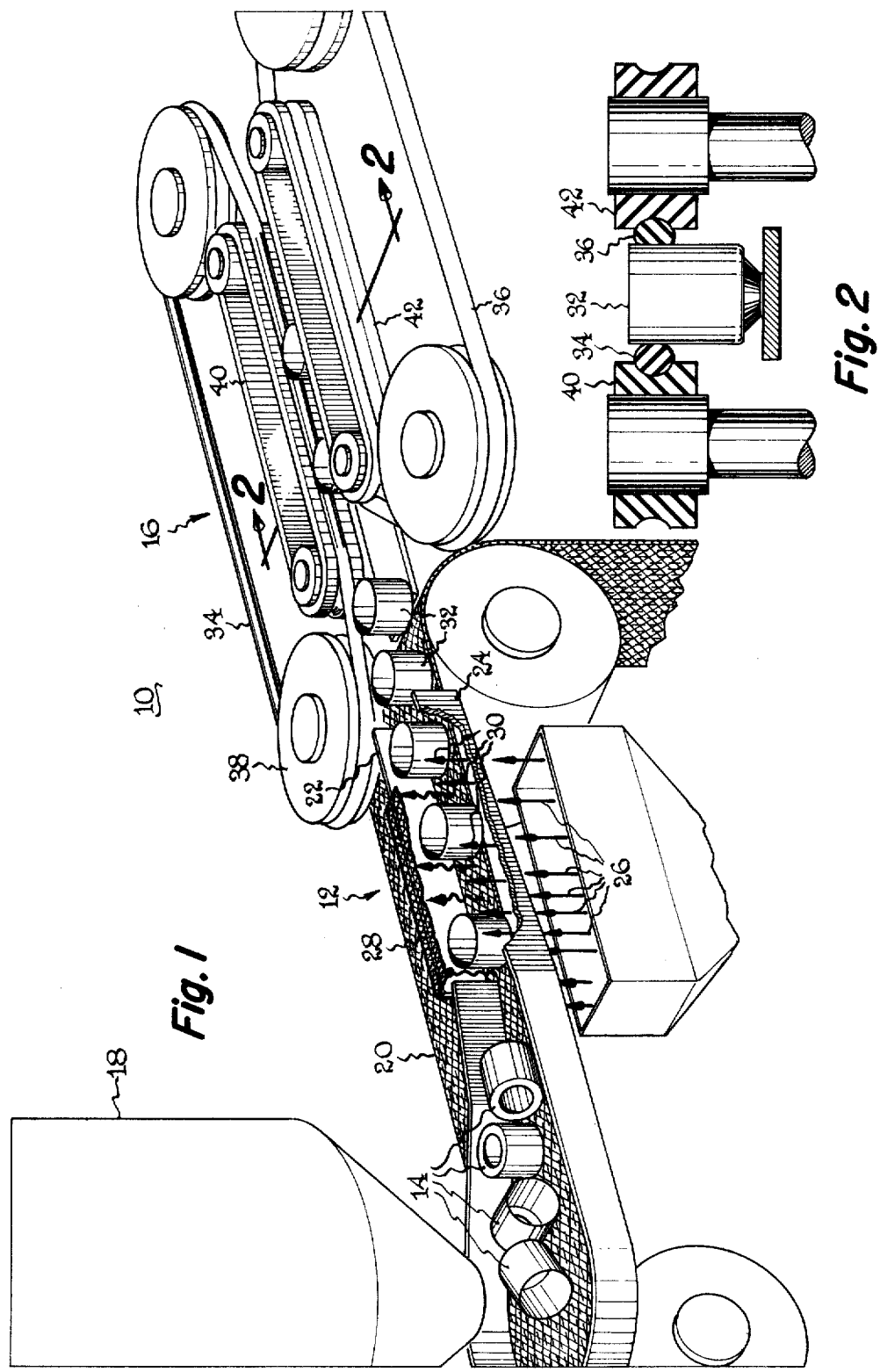

CYLINDER HANDLING DEVICE

BACKGROUND OF THE INVENTION

Automatic handling equipment for metal cylinders is known which includes various means to orient said cylinders with the cylindrical axis in a vertical direction, and it is further known to accomplish this objective with a moving gas stream, generally air. For example, U.S. Pat. No. 3,326,350 discloses a lamp bulb handling device utilizing a mesh conveyor belt which carries randomly oriented glass bulbs and through which a column of air is blown to properly orient the bulbs for pickup by a second conveyor belt. Another U.S. Pat. No. 2,904,162 patent employs air jet means to orient lamp bases of a cylindrical construction in the vertical direction while these articles are being fed to lamp assembly apparatus.

Still other material handling equipment is known which include means to shape various type articles while the articles are being transported by the equipment. In U.S. Pat. No. 2,925,053 there is disclosed a dough shaping and conveying apparatus which utilizes two conveyor belts driven at different speeds. Dough is fed between the two belts and shaped into balls while being conveyed by a gripping action exerted between the moving belts members. A different material handling apparatus is disclosed in U.S. Pat. No. 2,582,491 which includes means to straighten round rods or tubes by passage between a stationary belt and a moving belt. The articles are fed between the two belts where they are rolled and conveyed forward to provide the straightening action. The particular rods or tubes being straightened in this manner are plastic material which is fed to said equipment while still warm and flexible in order to retain the straightened condition when cooled to a state of hardness.

SUMMARY OF THE INVENTION

The present invention relates to a method and apparatus for automatically removing any out-of-round condition found in deformable metal cylinders while these articles are being transported to other processing equipment. More particularly, the present cylinder handling method and apparatus is characterized in that the metal cylinders are first oriented in a vertical direction while being transported and then passed between a pair of spaced apart endless conveyor belts in continuous and successive fashion for rotation of the vertically aligned cylinders while exerting sufficient mechanical force to remove any out-of-round condition found while said cylinders are still being transported.

In a preferred embodiment, the present method feeds a plurality of deformable metal cylinder to moving alignment means which orient each cylinder with the cylindrical axis in a vertical direction by a moving gas stream and aligns said vertically oriented cylinders in a row to be successively fed between a pair of spaced apart endless conveyor belts traveling at different linear speeds with sufficient mechanical force being exercised to remove any out-of-round condition found. The preferred apparatus for carrying out said method utilizes a pair of horizontally disposed members having openings to permit gas passage therethrough for vertical alignment of the metal cylinders being transported on a lower belt member and feeds a row of said vertically oriented cylinders without interruption to a pair of spaced apart endless conveyor belts moving forward in the same direction at different linear speeds which rotates said vertically aligned cylinders while moving forward to correct any out-of-round condition found. The vertically aligned cylinders in the preferred apparatus are also gripped only on a limited portion of the circular periphery by the cooperating endless belt members, and a further horizontally disposed moving belt can be provided to physically support the aligned cylinders from below during passage between said spaced apart endless belt members. Some rotation of the vertically orienting cylinders prior to entry between the cooperating belt members which correct the out-of-round condition can also be achieved in the preferred apparatus since the lower moving belt member which transports the cylinders during orienting does not entirely obstruct the moving gas stream. A greater velocity at the unobstructed portion of said gas stream causes the vertically orienting cylinders to rotate and move in a horizontal direction while being transported on said moving belt member.

BRIEF DESCRIPTION OF THE DRAWINGS

The present improvement is more clearly understood from the following description taken in conjunction with the accompanying drawings in which:

FIG. 1 is a perspective view depicting a preferred cylinder handling apparatus of the present invention; and FIG. 2 is a sectional view taken along the line 2—2 of FIG. 1.

DESCRIPTION OF THE PREFERRED EMBODIMENTS

Referring to FIG. 1, there is shown a cylinder handling apparatus 10 which generally includes a moving alignment means 12 that continuously feeds a plurality of deformable metal cylinders 14 to another conveyor arrangement 16 where any out-of-round condition is corrected while the metal cylinders are moved therethrough. Conventional feeder means 18 such as a vibratory feeder device, provides a supply of the deformable metal cylinders to the moving alignment means of said apparatus. Said alignment means includes a first conveyor belt 20 of wire mesh construction which moves in a horizontal direction between the feeder device 18 and the second conveyor arrangement 16. A pair of side wall members 22 and 24 are disposed along the travel path of said first conveyor belt 20 to align metal cylinders in a row while moving on said conveyor. A vertical column of air 26 is provided below said first conveyor belt 20 in a sufficient flow to raise the moving cylinders upon passage through the open mesh construction of the conveyor belt and orient each cylinder with the cylindrical axis in a vertical direction. A stationary screen member 28 is disposed horizontally over the moving screen conveyor 20 to contain the metal cylinders in a vertical alignment while being transported continuously to the second conveyor arrangement 16. It can also be noted from said drawing that the moving conveyor belt does not completely obstruct the vertical air column being passed therethrough which results in a higher velocity gas stream 30 being furnished to one side of the moving metal cylinders. Passage of the moving gas stream in this manner causes some rotation of the metal cylinders in a horizontal direction after being vertically aligned in said moving alignment means.

The vertically aligned metal cylinders 32 are continuously discharged from said first conveyor belt member 20 to the second conveyor arrangement 16. Specifically, said vertically aligned cylinders are continuously fed to a pair of spaced apart endless conveyor belts 34 and 36 which are traveling at different linear speeds. The vertically aligned cylinders are gripped between this pair of spaced apart endless conveyor belts with sufficient mechanical force to rotate said cylinder and remove any out-of-round condition found while said cylinders are being transported therethrough. Said belt members are supported by rollers 38 and driven by an associated belt drive means to continuously move the vertically aligned metal cylinders through the conveyor arrangement. As can be noted from the drawings, the cooperating belt members 34 and 36 are horizontally disposed with respect to each other and each belt has a circular cross section of relatively small diameter so as to grip the vertically aligned cylinders only at a limited portion of the exterior peripheral surface. Another pair of associated moving flat belts 40 and 42 are also disposed in a horizontal direction along the travel path of said conveyor arrangement 16 to frictionally engage the conveyor belt members 34 and 36 and yieldably urge said conveyor belts against the external peripheral surface of the vertically oriented cylinders during passage therethrough.

A still more detailed explanation of the manner in which a vertically oriented metal cylinder can be restored to a round condition is provided in connection with FIG. 2. Specifically, FIG. 2 is a sectional view taken along the line 2—2 of FIG. 1 wherein one vertically aligned metal cylinder 32 is shown suspended between the conveyor belt members 34 and 36 while being transported in a horizontal direction. Rotation of the vertically suspended metal cylinder caused by unequal linear speed of said belt members produces a greater mechanical deformation force upon encountering any oval condition in the suspended cylinder. Such greater mechanical deformation force is generated along the longer cross sectional axis of a deformed oval cylinder causing said cylinder to exceed the elastic limit along said axis and thereby restoring the cylinder to a circular cross section.

It will be evident to those skilled in the art that various changes may be made in the method and apparatus of the present invention within the spirit and scope of the invention as set forth in the appended claims.

What I claim as new and desire to secure by United States Letters Patent is:

1. A method of automatically removing any out-of-round condition in deformable metal cylinders which comprises:
   (a) feeding a plurality of deformable metal cylinders in a horizontal direction to moving alignment means including a vertical gas column which orients each cylinder with the cylindrical axis in a vertical direction and aligns said vertically oriented cylinders in a row while being rotated, and
   (b) gripping the vertically aligned rotating cylinders successively between a pair of spaced apart horizontally disposed conveyor belts traveling at different linear speeds with sufficient mechanical force to rotate said cylinders and remove any out-of-round condition found while said cylinders are being transported.

2. A method as in claim 1 which further includes automatically depositing a plurality of the cylinders on the surface of a moving belt member forming part of the alignment means.

3. A method as in claim 1, the vertically aligned cylinders are also physically supported from below by an additional conveyor belt while being rotated between the spaced apart conveyor belts.

4. A cylinder handling apparatus to automatically remove any out-of-round condition in deformable metal cylinders which includes:
   (a) moving alignment means having openings to permit gas passage therethrough which position a plurality of said cylinders in a vertical direction by moving said cylinders in a horizontal direction through the path of a vertical gas column while being rotated, and
   (b) a pair of spaced apart horizontally disposed endless belts which grip the vertically aligned rotating cylinders therebetween and are provided with motive means to move said belts at different linear speeds.

5. An apparatus as in claim 4 which further includes automatic feeder means to deposit a plurality of the cylinders on the surface of a moving belt member forming part of the alignment means.

6. An apparatus as in claim 4 wherein the cylinders are contained between a pair of horizontally disposed members spaced apart in a vertical direction and with the lower member being a moving belt positioned so as not to obstruct the entire gas column whereby rotation is imparted to the vertically aligned cylinders.

7. An apparatus as in claim 4 which further includes a horizontally disposed conveyor belt to physically support the aligned cylinders from below during passage between the spaced apart conveyor belts.

8. An apparatus as in claim 4 whereas the spaced apart conveyor belts are disposed side-by-side and grip only a limited portion of the vertically aligned cylinders.

* * * * *